United States Patent
LaBruno et al.

(10) Patent No.: US 6,932,998 B2
(45) Date of Patent: Aug. 23, 2005

(54) APPARATUS AND METHOD FOR FORMING TWO COMPONENT FOOD PRODUCT

(75) Inventors: Ronald F. LaBruno, Mount Prospect, IL (US); Douglas Conerton, Bourbonnais, IL (US)

(73) Assignee: Formax, Inc., Mokena, IL (US)

( * ) Notice: Subject to any disclaimer, the term of this patent is extended or adjusted under 35 U.S.C. 154(b) by 117 days.

(21) Appl. No.: 10/455,739

(22) Filed: Jun. 5, 2003

(65) Prior Publication Data

US 2004/0244602 A1 Dec. 9, 2004

(51) Int. Cl.$^7$ .................................................. A23P 1/12
(52) U.S. Cl. ...................... 426/513; 426/281; 426/282; 426/284
(58) Field of Search ................. 426/512, 513, 426/281, 282, 284

(56) References Cited

U.S. PATENT DOCUMENTS

| | | | |
|---|---|---|---|
| 3,887,964 A | | 6/1975 | Richards |
| 4,054,967 A | | 10/1977 | Sandberg et al. |
| RE30,096 E | | 9/1979 | Richards |
| 4,182,003 A | | 1/1980 | Lamartino et al. |
| 4,404,229 A | * | 9/1983 | Treharne ............... 426/513 |
| 4,740,379 A | * | 4/1988 | Noguchi et al. ......... 426/513 |
| 4,768,260 A | | 9/1988 | Sandberg |
| 4,768,325 A | | 9/1988 | Lindee et al. |
| 4,928,591 A | | 5/1990 | Lindee |
| 4,996,743 A | | 3/1991 | Janssen |
| 5,022,888 A | | 6/1991 | Lindee |
| 6,428,303 B2 | | 8/2002 | Lindee et al. |

* cited by examiner

*Primary Examiner*—George C. Yeung
(74) *Attorney, Agent, or Firm*—The Law Office of Randall T. Erickson, P.C.

(57) ABSTRACT

A method and apparatus for forming molded food products having an outer first component and an inner second component is provided. The apparatus includes a pressurized supply of first component and a pressurized supply of second component. A mold housing extends along a first direction. A first end portion and a second end portion are arranged to be movable along the first direction within the mold housing and to be separated by a pre-selected distance along the first direction. An injector tube is in fluid communication with the supply of pressurized second component. The first and second end portions are arranged to be contained within the mold housing in a fill position to form a mold cavity within the mold housing around the injector tube. The mold cavity has an inlet in fluid communication with the supply of pressurized first component when in the fill position to receive first component to form a shell having an inside void. The injector tube provides a pathway for the pressurized second component into the inside void of the shell to fill the inside void with the second component to complete a two-component molded food product.

4 Claims, 8 Drawing Sheets

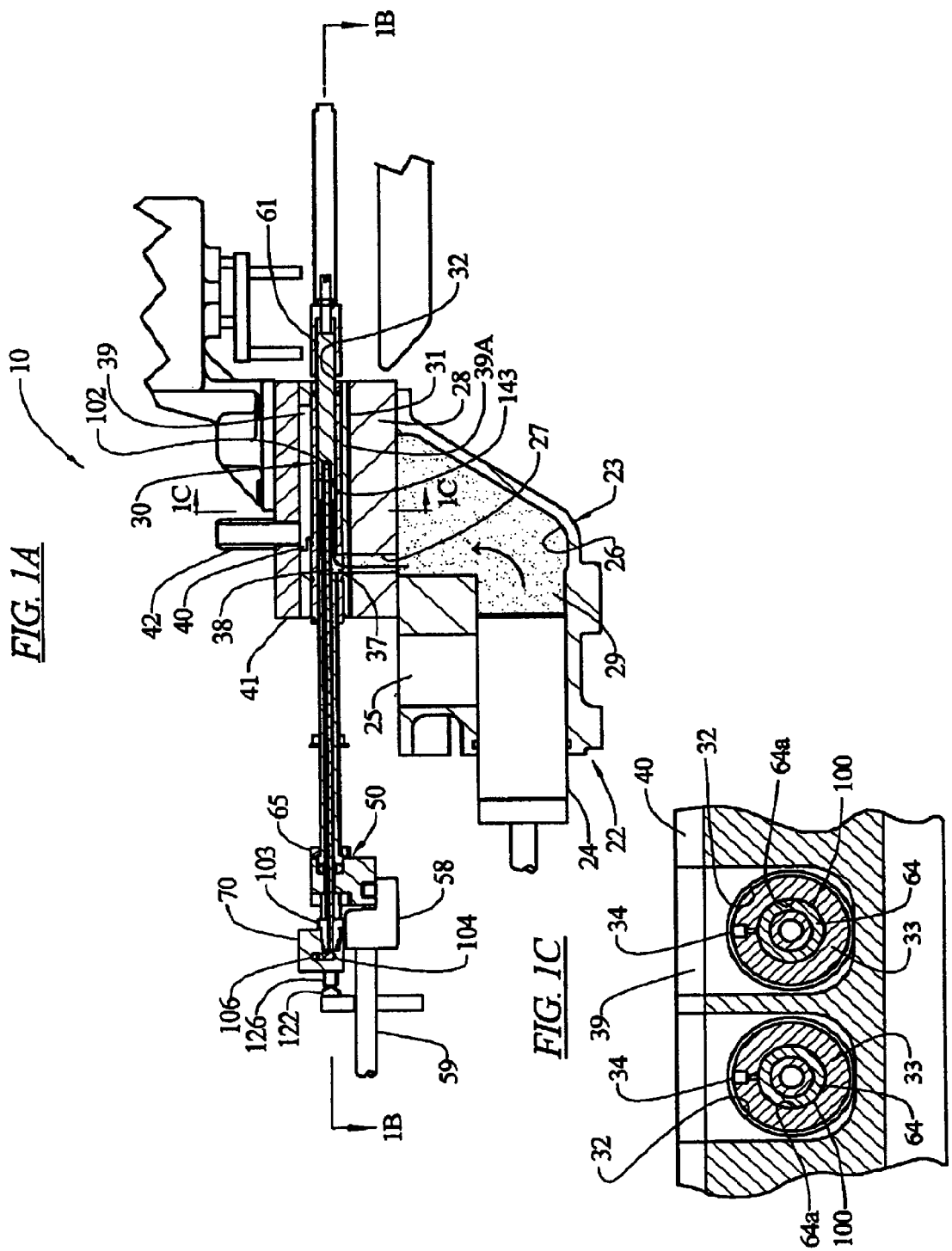

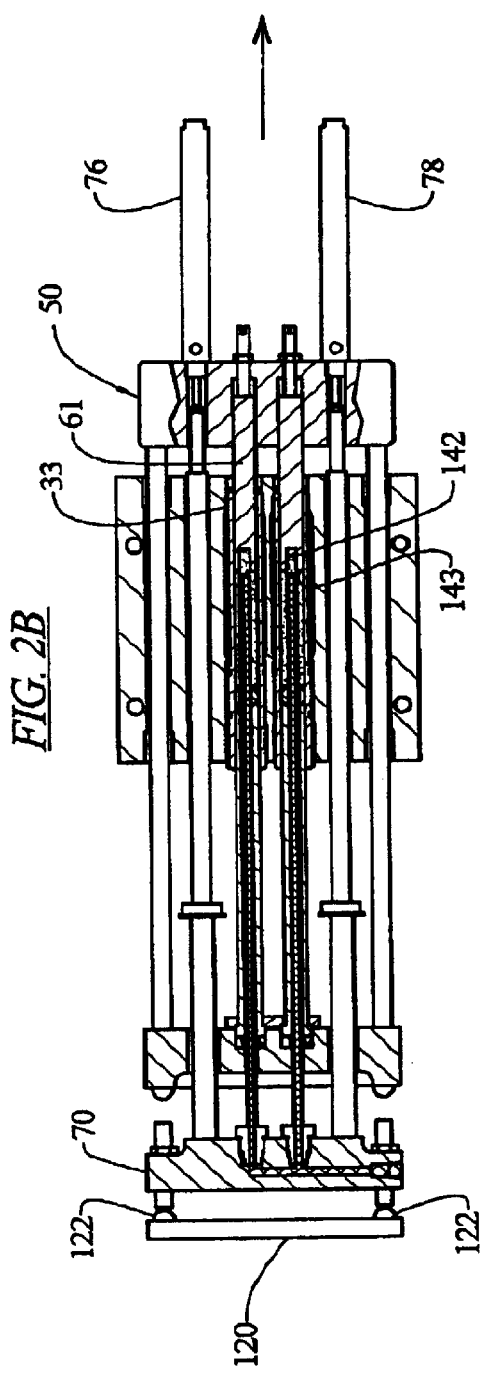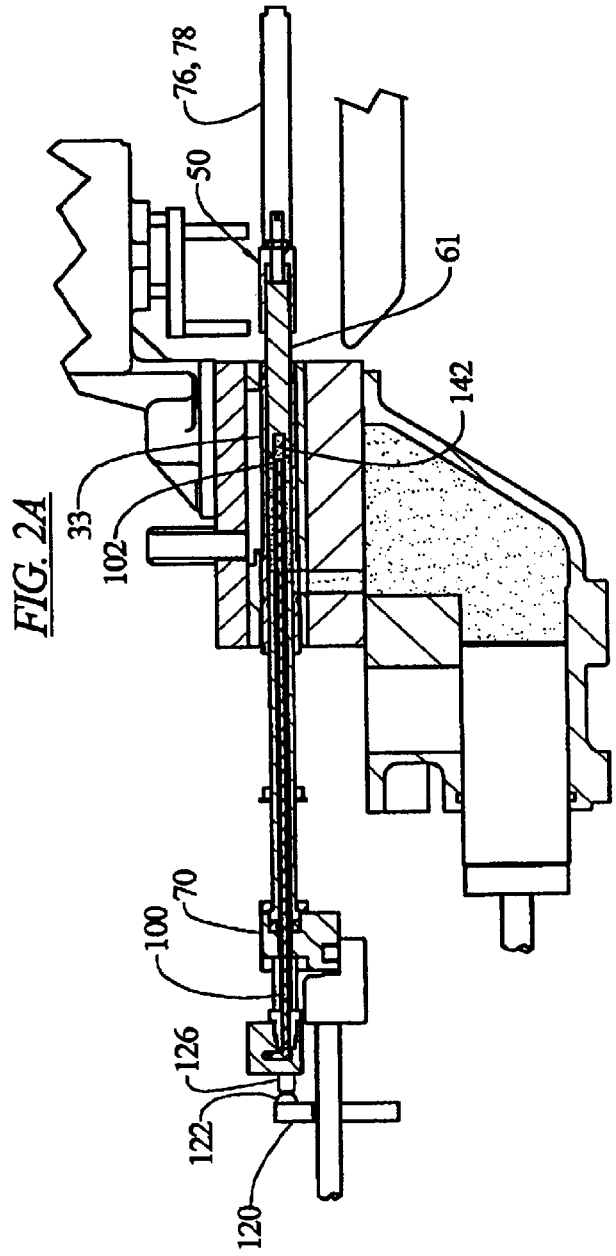
FIG. 2B
FIG. 2A

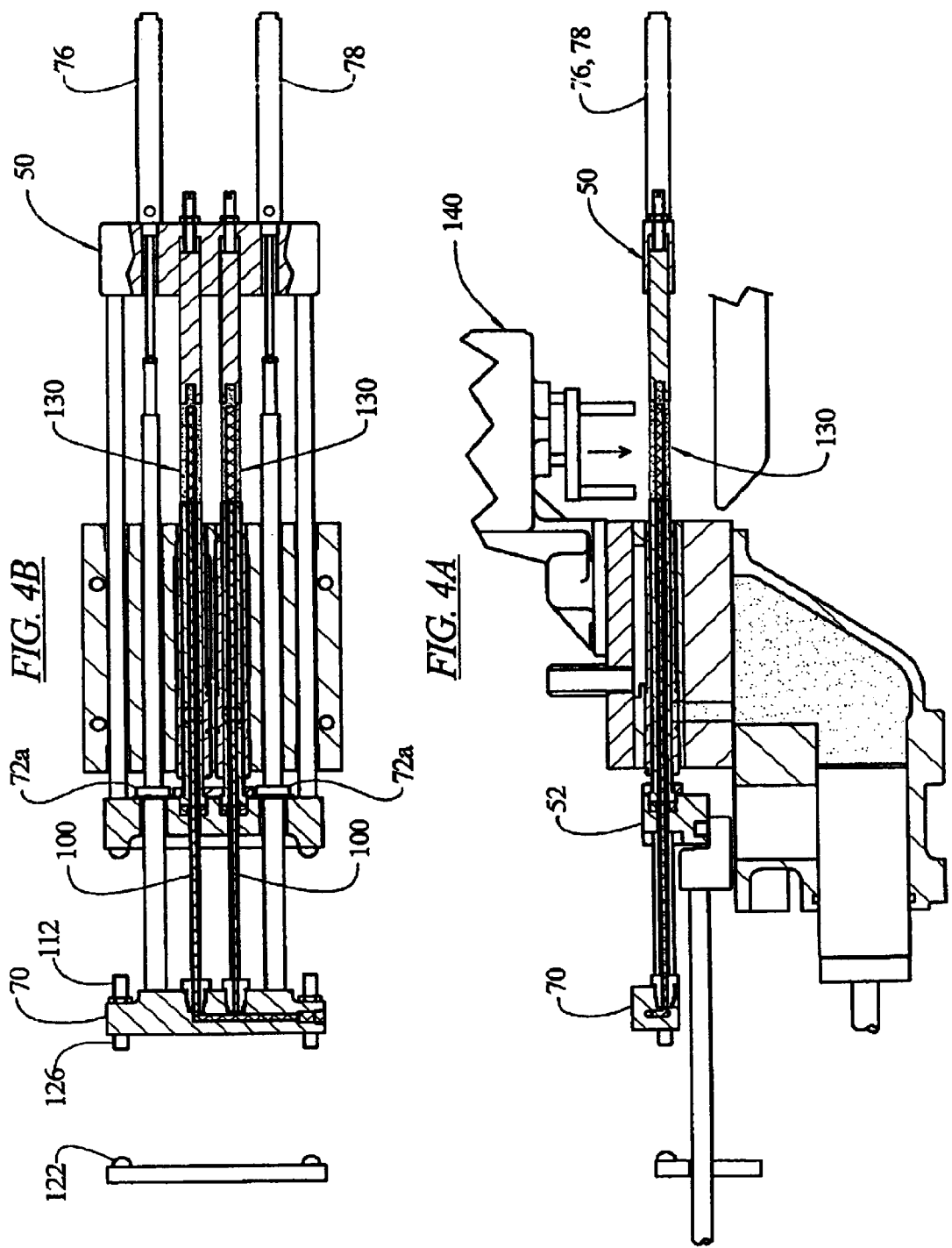

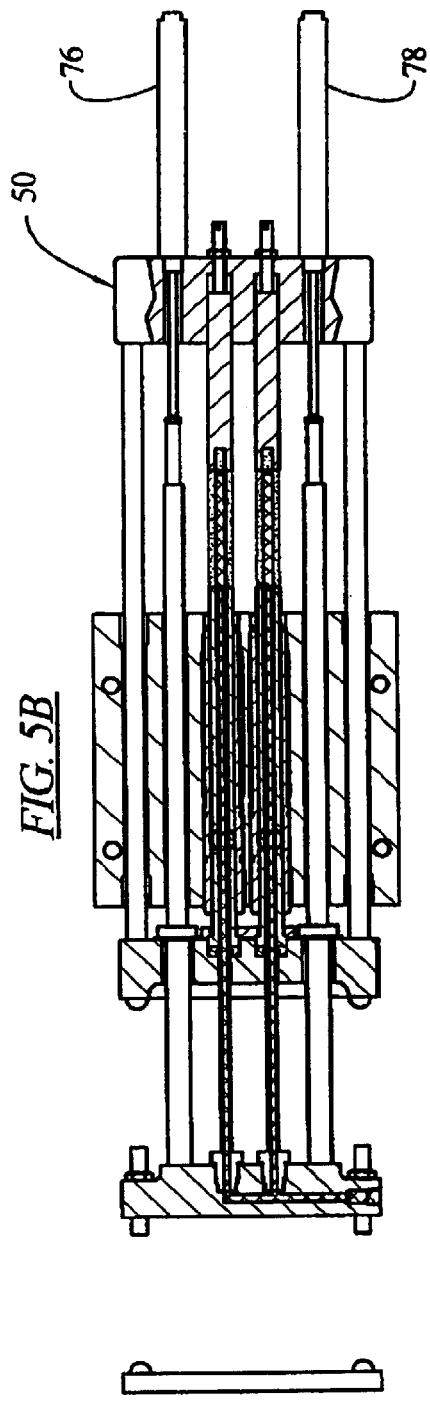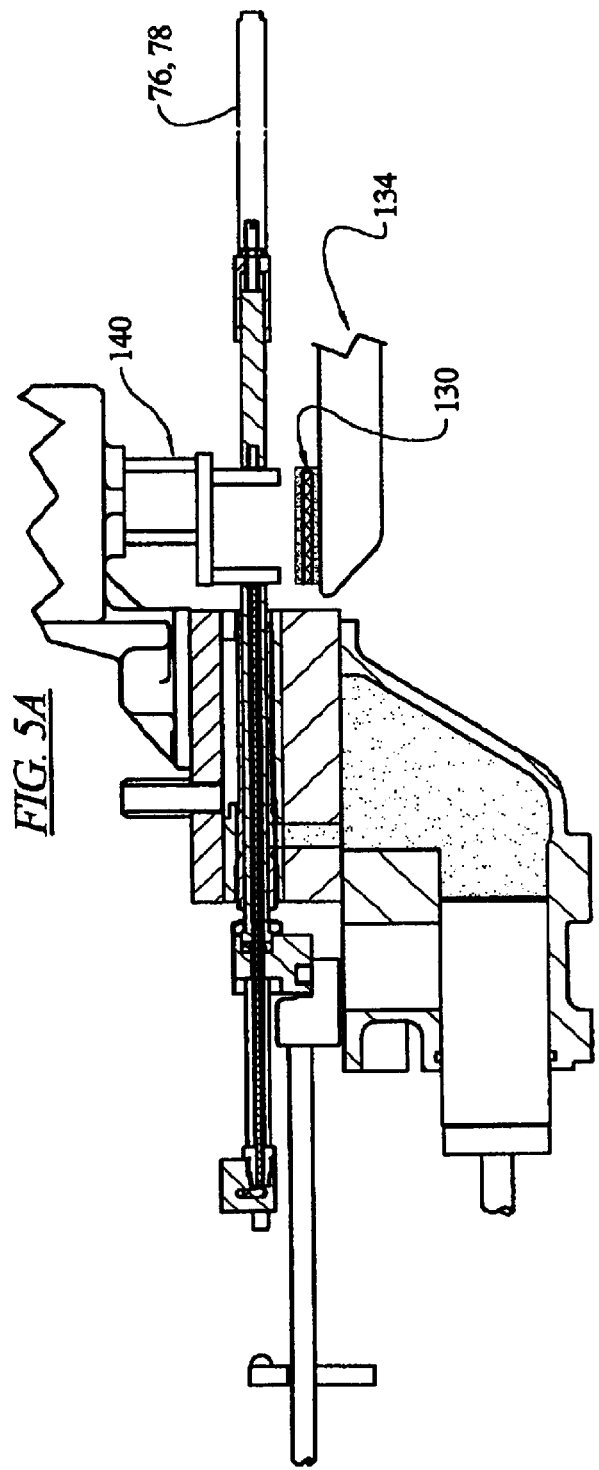

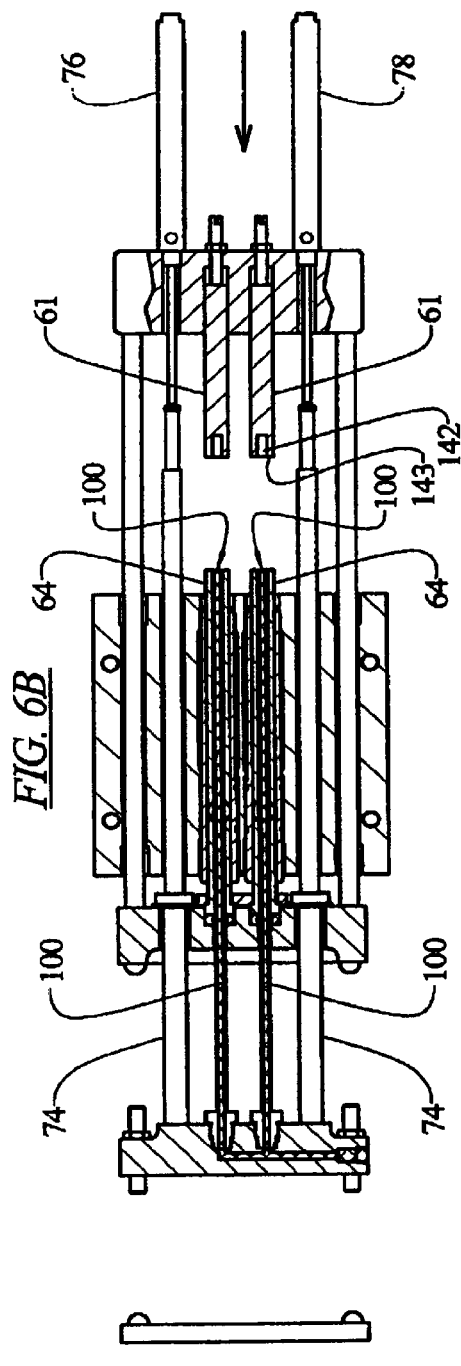
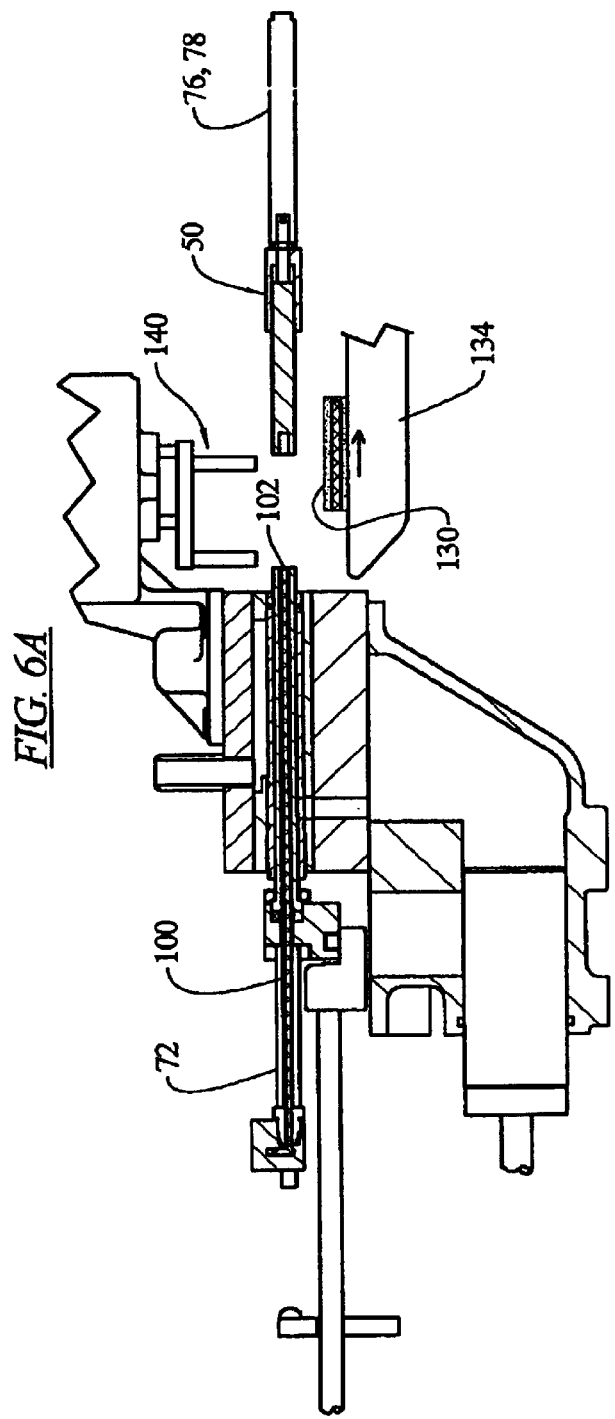
FIG. 6B
FIG. 6A

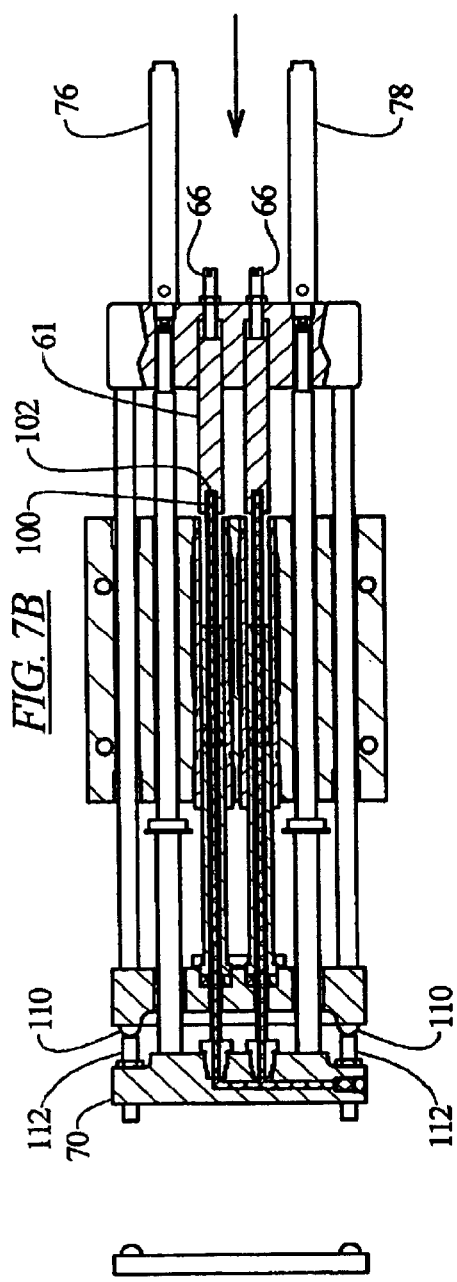
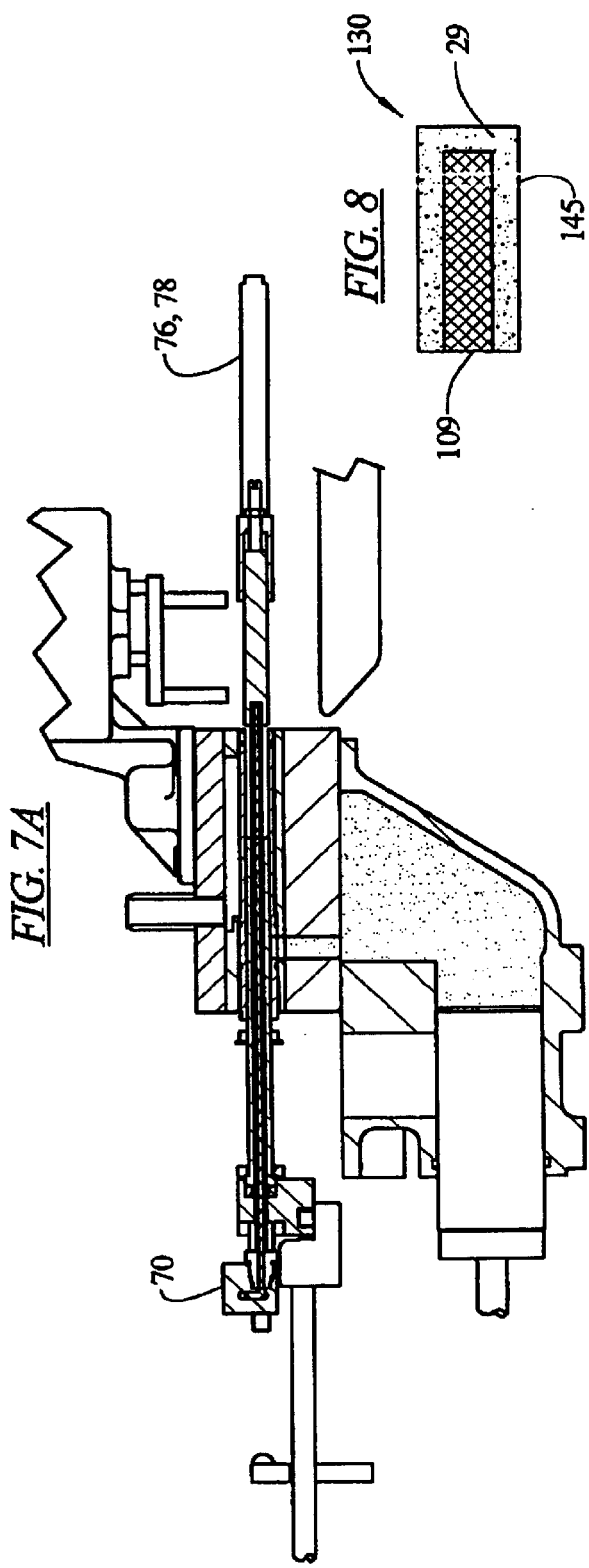

US 6,932,998 B2

APPARATUS AND METHOD FOR FORMING TWO COMPONENT FOOD PRODUCT

TECHNICAL FIELD OF THE INVENTION

The invention relates to reciprocating mold plate forming machines for the production of molded food products. Particularly, the invention relates to the molding of elongated molded food products, such as rod-shaped links.

BACKGROUND OF THE INVENTION

Reciprocal mold plate food patty molding machines are known for the production of elongated food products such as sausages. One example of such a machine is described in Lindee, U.S. Pat. No. 4,928,591, herein incorporated by reference. Other machines that can be adapted to mold elongated food products are disclosed in U.S. Pat. No. Re. 30,096; 4,054,967; 4,182,003; and 4,768,260, all herein incorporated by reference.

The machine described in U.S. Pat. No. 4,928,591 includes a food pump for use in pumping a moldable food material under pressure into one end of a fill passage, and a mold tube assembly mounted in alignment with the other end of the fill passage. The mold tube assembly includes a plurality of elongated mold tubes each of given length, each mold tube aligned parallel to a predetermined mold path and each mold tube having a fill opening aligned with the fill passage.

The mechanism further includes a mold rod assembly comprising a front drawbar, a rear drawbar, and guide means that interconnects the drawbars for maintaining the drawbars in fixed spaced relation to each other adjacent opposite ends of the mold tube assembly. Each drawbar extends across the mold path. The mechanism further includes front mold rods, mounted on the front drawbar, each projecting towards the mold tube assembly parallel to the mold path and in alignment with one of the mold tubes; and rear mold rods, mounted on the rear drawbar, each projecting toward the mold tube assembly parallel to the mold path and into one of the mold tubes. The ends of the front and rear mold rods that are aligned with each mold tube are spaced from each other by a predetermined distance "L" less than the length of the mold tube. The mechanism also comprises drive means, connected to the mold rod assembly, for cyclically reciprocally driving the mold rod assembly along the mold path between a fill position and a discharge position. In the fill position, food material flows from the fill passage into each mold tube between the spaced ends of the mold rods to form a rod-shaped food product in each mold tube of length "L". In the discharge position, the ends of both sets of mold rods are clear of the front ends of the mold tubes and each rear mold rod fills the interior of its associated mold tube.

The aforementioned machine is effective at producing rod-shaped food products from a single food product material source.

The present inventors have recognized that it would be desirable to provide a method and apparatus for the production of food products having two materials or components. The present inventors have recognized that such method and apparatus would be particularly useful for molding elongated or rod-shaped food products containing two food components, an outer shell component and an inner filling component. The present inventors have recognized that the products of the method and apparatus could utilize poultry, beef, pork, fish or other meat material for the outer, shell component, and cheese, fruit fillings, stuffing, crab or other ingredients for the inner, filling component.

SUMMARY OF THE INVENTION

The present invention provides a method and apparatus for forming molded food products having an outer first component and an inner second component. The apparatus is charged by a pressurized supply of first component and a pressurized supply of second component. One or both of the first and second components is a food product. The food product could be for humans or animals. One or both of the first and second components could also possibly be a medicine, a vitamin supplement, other non-dietary treatment, or a non-edible support or covering.

The apparatus includes a mold housing that extends along a first direction. The apparatus includes a first end portion, a second end portion, and an injector portion. The first and second end portions are arranged to be movable along the first direction within the mold housing and arranged to be separated by a pre-selected distance along the first direction. The injector portion is in fluid communication with the supply of pressurized second component. The first and second end portions are arranged to be contained within the mold housing in a fill position to form a mold cavity within the mold housing around the injector portion. The injector portion extends into the cavity along the first direction.

The mold cavity has an inlet in fluid communication with the supply of pressurized first component when in the fill position to receive first component to form a shell having an inside void. The first and second end portions are relatively movable along the first direction with respect to the mold housing and the injector portion. The injector portion provides a pathway for the pressurized second component into the inside void of the shell to fill the inside void with the second component to complete a molded food product.

The first and second end portions are further movable with respect to the mold housing to a discharge position to expose the molded food product outside the mold housing in order to remove the molded food product from between the end portions.

In the preferred embodiment, the mold housing comprises a tube and the first and second end portions comprise end faces of front and rear rods that are fit in sliding fashion within the tube.

In the preferred embodiment, the injector portion comprises an injector tube, the injector tube having an open end extending into the mold cavity. The open end can be closed against the first end portion when the mold cavity is in the fill position and the open end is then exposed within the mold cavity by differential movement between the first end portion and the injector portion.

In the preferred embodiment, a mechanism is provided for moving the first and second end portions along the first direction from the fill position toward the discharge position with respect to the injector tube, the open end relatively moving within the inside void along a reverse direction to the first direction, and after the open end moves a short distance, the inside void then filling along its length with the second component.

In the preferred embodiment, the injector portion is relatively movable with respect to the first and second end portions until the inside void is filled; and a mechanism is provided operatively connected to the injector portion to move the injector portion, after the inside void is filled, with the first and second end portions to the discharge position.

In a refinement of the preferred embodiment, a molding mechanism for molding two component rod-shaped food products includes:

a pump for pumping a shell component under pressure into one end of a fill passage;

a mold tube assembly mounted in alignment with the other end of the fill passage, the mold tube assembly including a plurality of elongated mold tubes each of given length, each mold tube aligned parallel to a predetermined mold path and each mold tube having a fill opening aligned with the fill passage;

a mold rod assembly comprising:
  a front drawbar;
  a rear drawbar;
  guide means, interconnecting the drawbars, for maintaining the drawbars in fixed spaced relation to each other adjacent opposite ends of the mold tube assembly, with each drawbar extending across the mold path;
  a set of front mold rods, mounted on the front drawbar, each projecting toward the mold tube assembly parallel to the mold path and in alignment with one of the mold tubes;
  a set of rear mold rods, mounted on the rear drawbar, each projecting toward the mold tube assembly parallel to the mold path and into one of the mold tubes;
  the ends of the front and rear mold rods aligned with each mold tube being spaced from each other by a predetermined distance L less than the length of the mold tube, and forming a mold cavity of length L within the mold tube;
  at least one of the front mold rods or the rear mold rods being hollow and providing an injection path into the cavity;
  drive means, connected to the mold rod assembly, for cyclically reciprocally driving the mold rod assembly along the mold path between a fill position, in which shell component flows from the fill passage into each mold tube between the spaced ends of the mold rods to form a shell of length equal to the length L in each mold tube, and the discharge position in which the ends of both sets of mold rods are clear of the front ends of the mold tubes and each rear mold rod fills the interior of its associated mold tube; and
  a supply of filler component flowable through the injection path and into the shell.

In a further refinement of this apparatus, an injector tube is arranged within the injection path, and a mechanism for moving the injection tube relatively with respect to the front mold rod, the injector tube positionable in part within the mold cavity to provide a void within the shell when molded, the injector tube having an open end that is exposable within the mold cavity, the injector tube flow connected to the supply of filler component to fill the void with filler component.

A preferred method of the invention for forming a molded food product having a first component surrounding an inner, second component, comprises the steps of:
  arranging a mold cavity defined by an outer wall and an inner tube, the inner tube having an open end, and two end wall portions spaced apart and positionable within the outer wall;
  filling the mold cavity with a first component forming a shell having an inside void;
  relatively retracting the inner tube along a first axis with respect to the mold cavity and filling the inside volume occupied by the inner tube with the second component through the inner tube and out of the inner tube open end to complete the molded food product; and
  moving the end wall portions along the first axis to a position wherein the molded food product is outside the outer wall to remove the molded food product.

According to another aspect of the preferred method, the inner tube open end is relatively movable with respect to the end wall portions only to positions at or between the end wall portions.

According to another aspect of the preferred method the outer wall is stationary and the end wall portions are formed on rods which are configured to slide within the outer wall.

According to another aspect of the preferred method, the inner tube is movable with respect to the outer wall.

The invention is particularly adapted to produce an elongated, rod-shaped food product having a first food component on the outside and a second food component on the inside. Alternatively, one or both of the first and second components could also possibly be a medicine, a vitamin supplement, other non-dietary treatment, or a non-edible support or covering.

Numerous other advantages and features of the present invention will be become readily apparent from the following detailed description of the invention and the embodiments thereof, and from the accompanying drawings.

BRIEF DESCRIPTION OF THE DRAWINGS

FIG. 1A is a diagrammatic, vertical sectional view of a forming machine according to an embodiment of the invention, the forming machine shown during the dwell period of a retracted position;

FIG. 1C is an enlarged, fragmentary sectional view taken generally through section 1C—1C of FIG. 1A;

FIG. 2A is a diagrammatic, vertical sectional view of the forming machine of FIGS. 1A–1C, the forming machine shown moving toward a discharge position;

FIG. 2B is a diagrammatic, horizontal sectional view of the forming machine of FIG. 2A;

FIG. 4A is a diagrammatic, vertical sectional view of the forming machine of FIGS. 3A and 3B, the forming machine shown in the dwell period in the discharge position;

FIG. 4B is a diagrammatic, horizontal sectional view of the forming machine of FIG. 4A;

FIG. 5A is a diagrammatic, vertical sectional view of the forming machine of FIGS. 4A and 4B, the forming machine shown at a later time during the dwell period in the discharge position;

FIG. 5B is a diagrammatic, horizontal sectional view of the forming machine of FIG. 5A;

FIG. 6A is a diagrammatic, vertical sectional view of the forming machine of FIGS. 5A and 5B, the forming machine shown commencing a return stroke toward the retracted position;

FIG. 6B is a diagrammatic, horizontal sectional view of the forming machine of FIG. 6A;

FIG. 7A is a diagrammatic, vertical sectional view of the forming machine of FIGS. 6A and 6B, the forming machine shown moving toward the retracted position;

FIG. 7B is a diagrammatic, horizontal sectional view of the forming machine of FIG. 7A; and FIG. 8 is an enlarged longitudinal sectional view of a molded product produced by the forming machine of FIGS. 1A–7B.

DETAILED DESCRIPTION OF THE PREFERRED EMBODIMENTS

Figure 1B:
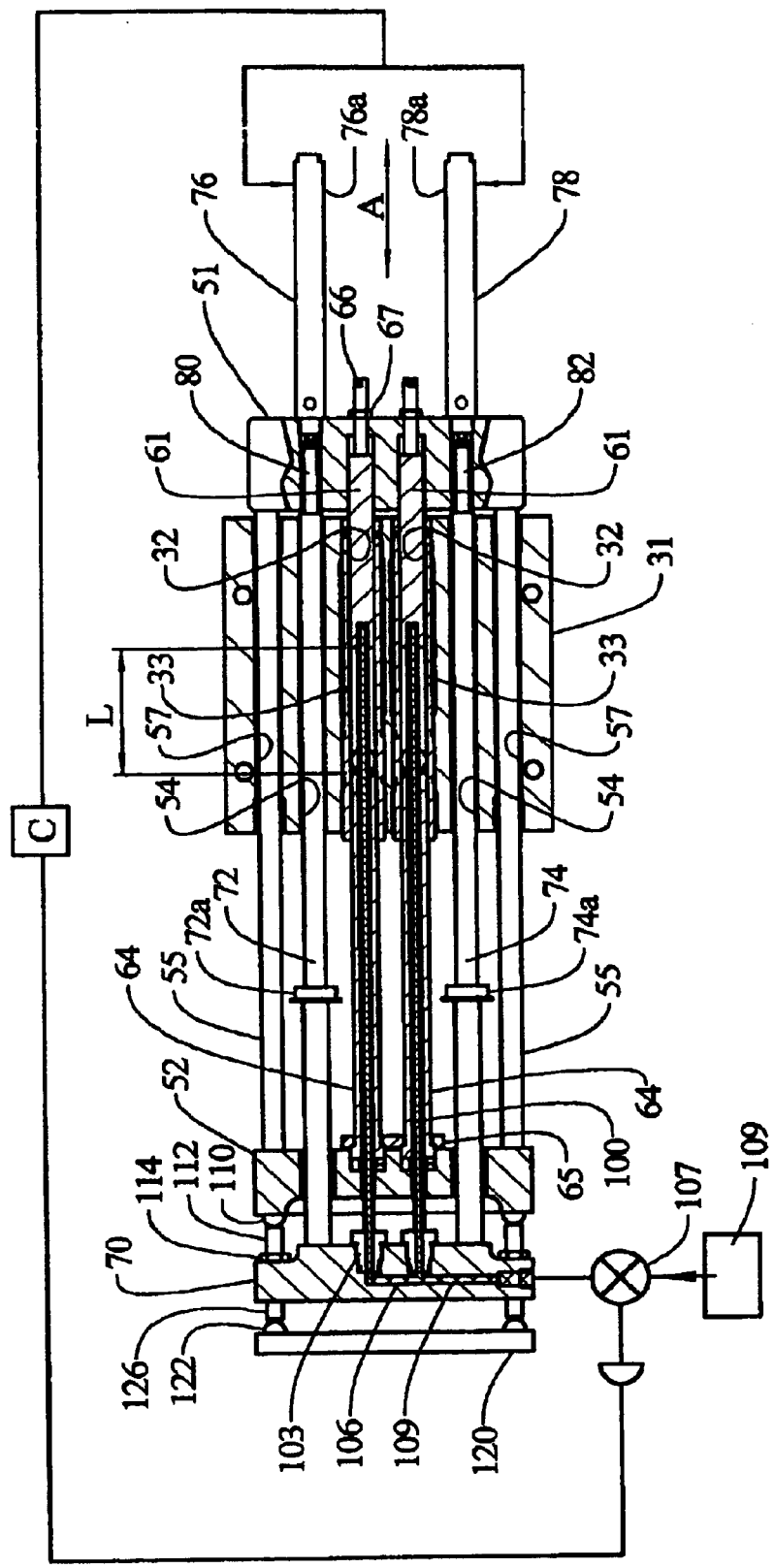
FIG. 1B is a diagrammatic, horizontal sectional view taken generally along line 1B—1B of FIG. 1A.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1A and 1B illustrate in diagrammatic form an apparatus 10 for the production of elongated food products such as sausages. The basic patty-molding apparatus may correspond to that described in U.S. Pat. No. 4,928,591, herein incorporated by reference. As shown in the Figures, the apparatus is arranged to feed food product into a molding station of the apparatus from below. However, it should be recognized that the invention is equally applicable to a reciprocal molding machine in which the food product material is fed into the molding station from above.

The apparatus 10 includes a food pump 22 comprising a pump housing 23 and a piston 24, a food material inlet 25 connecting a supply of a moldable food material with a pump chamber 26, and a fill passage 27 that extends from chamber 26 upwardly through a fill plate 28 covering a part of the housing 23.

In operation, the food pump 22 receives a first moldable food material, such as sausage meat 29 in its inlet 25; that food material being admitted to the pump chamber 26 on the withdrawal stroke of the piston 24. Subsequently, the piston 24 is driven into chamber 26, to pump the moldable food material under pressure into the lower end of the fill passage 27.

The apparatus includes a mold tube assembly 30. The mold tube assembly 30 comprises a manifold or housing 31 that has a plurality of axial openings 32 for receiving a same number of mold tubes 33. As best shown in FIG. 1B, the axial openings 32 through manifold housing 31 are parallel to the mold path "A" of the molding apparatus.

The mold tube assembly 30 further comprises the elongated mold tubes 33. The illustrated embodiment has two mold tubes 33; however any number of mold tubes, from one or more can be used and is encompassed by the invention.

Advantageously, plural mold tubes are aligned across the width of the forming machine. Each mold tube 33 includes a multiplicity of breather vents, the small holes 34, shown in FIG. 1C. Vents 34 are distributed throughout the central portion of each mold tube 33 and are also distributed around the periphery of the mold tube. Vents 34 are small enough so that food particles, in the food material, will not pass through them.

The bottom of manifold housing 31 has a series of fill passage extension holes 37 cut through it, as indicated in FIGS. 1A and 1C. Each fill passage extension 37 is aligned with the main fill passage 27 that is part of food pump 22. Each mold tube 33 has a fill opening 38 aligned with one of the fill passage extension 37 when the mold tube is in the fill position.

In the top of manifold 31 of mold tube assembly 30 there is a series of breather passage 39, one for each mold tube 33. In the central portion of manifold housing 31 each axial opening 32 is appreciably larger than the outer diameter of its mold tube 33 so that each of breather passage 39 is effectively extended, as at 39a, around the mold tube. Each breather passage 39, 39a should communicate with vents 34 along a substantial length of the medial portion of its mold tube 33. Each breather passage at which 39, 39a is in communication with a breather collector groove or passage 40 in the upper surface of manifold 31.

A cover plate 41 mounted on top of manifold 31 covers most of the breather collector groove or passage 40 and all of the breather openings 39. However, a product return line 42, connected to an opening through cover plate 41 communicates with breather collector groove 40. Return line 42 is utilized to return those limited quantities of tiny particles of food material that escape through mold tube vent holes 34 into one of breather passage 39, 39a, then into collector 40, and on to the food material supply.

A more complete description of the vents, breather and return food particle systems can be found in U.S. Pat. No. 4,928,591, herein incorporated by reference.

The apparatus further comprises a mold rod assembly 50. The mold rod assembly 50 includes a "tie bar" or front drawbar 51 and a "link tooling drawbar" or rear drawbar 52. The two drawbars 50, 51 are interconnected by a guide mechanism utilized to maintain the drawbars 50, 51 in fixed spaced relation to each other adjacent opposite ends of the mold tube assembly 30 with each drawbar extending across the mold path A. This guide mechanism includes two guide rods 55 each extending between and connected to both of the two drawbars 51 and 52. The guide rods 55 extend through and are guided by guide apertures 57 in the outer edge portions of manifold 31 parallel to mold path A, as shown in FIGS. 1A and 1C.

The rear drawbar 52 is affixed to a yoke 58 (FIG. 1A). The yoke 58 is driven by a drive rod 59 from a cyclic drive mechanism (not shown) of the kinds used in conventional reciprocating mold plate food patty molding machines, such as described in U.S. Pat. Nos. 6,428,303; 4,996,743; 4,768, 325; 4,182,003; 4,054,967; 3,887,964; or Re. 30,096, all herein incorporated by reference.

Mold rod assembly 50 comprises a set of front mold rods 61. Each mold rod 61 is affixed to the front drawbar 51 and projects toward one of the mold tubes 33 in a direction parallel to the mold path A. The mold rod assembly 50 also comprises a set of rear mold rods 64. Rear mold rods 64 are affixed to rear drawbar 52 by a retainer 65 and projects toward the mold tube assembly 30, each in centered alignment with one of the mold tubes 33, parallel to the mold path A. The retainer 65 is fastened to the drawbar 52 by fasteners (not shown) or by other known means. The ends of mold rods 61 and 64 facing toward each other are separated by predetermined lengths "L" as indicated in FIG. 1B. The position of the front mold rods 61 with respect to the front drawbar 51 can be adjusted by threaded adjustment of studs 66 and subsequent tightening with locknuts 67.

Spacing is preferably the same for the front and rear mold rods associated with each of the mold tubes, in effect creating a constant length "L" for each mold tube, but alternately can be adjusted to modify the length, quantity and/or to ensure the exact weight of sausage or other food material desired in the food product made in each mold tube on each stroke of the machine.

An injector manifold 70 is located behind the rear drawbar 52. Actuator rods 72, 74 are fixed to the manifold and penetrate in sliding fashion through the rear drawbar 52 and the manifold 31. The actuator rods 72, 74 include intermediate heads 72*a*, 74*a* fixed in position on the rods. Air cylinders 76, 78 are attached to the front drawbar 51 and have extendable cylinder rods 80, 82 axially aligned and connected to the actuator rods 72, 74 respectively. The cylinder rods 80, 82 slide through the front drawbar 51. Pistons (not shown) inside the housings 76*a*, 78*a* function under selected differential air pressure within the housings to extend or retract the cylinder rods 80, 82 with respect to the housings 76*a*, 78*a*.

The rear mold rods 64 are substantially hollow, having an axial bore 64*a* therethrough (FIG. 1C). An injector tube 100 is located coaxially at least partially within each mold rod axial bore 64*a*. The injector tube 100 has a forward open end 102 and a threaded fitting portion 103 defining a rear open end 104. The tube is substantially closed between the ends 102,104. The rear open end 104 is open to a supply plenum 106 of the injector manifold 70. A control valve 107 (FIG. 1B) controls supply of a second component 109 to the plenum 106. A pressurized source of component 109, such as cheese, is shown schematically as a box in FIG. 1B. A pump (not shown) similar to the pump 22 can be provided to maintain the component 109 in a pressurized state, either constantly or when needed.

A controller "C" controls the timing and operation of the control valve 107 and the cylinders 76, 78. The controller C can be incorporated into an electronic controller or processor that controls the entire machine operation and timing.

Between the manifold 70 and the rear drawbar 52 are arranged bumpers 110 and length-adjustable studs 112 with locknuts 114, carried by the manifold. Threaded adjustment of the studs 112, and subsequent tightening of the locknuts 114, sets the minimum distance between the manifold 70 and the rear drawbar 52. A rear bumper plate 120 includes forward facing bumpers 122 which contact rear portions 126 of the studs 112 to set the home position of the manifold 70. The rear bumper plate 120 is stationary on the machine frame (not shown) with the tube manifold 31.

The basic operation of the apparatus and the production of molded elongated food products can now be described. As previously noted, the food pump 22 maintains a supply of the outer, first component 29 under pressure in fill passage 27, up through fill passage extension 37 in the bottom of manifold 31. For the fill position, the opening 38 in each fill tube is aligned with one of the fill passage extensions 37 so that the outer, first component material 29 flows under pressure into an annular cavity defined in part by the interior of each mold tube 33 and the exterior of the injector tube 100.

The opposite ends of each mold tube 33 are closed by one of the front mold rods 61 and one of the rear mold rods 64, the distance between the ends of the mold rods being the product length L as shown in FIG. 1A. Thus, the quantity of material that enters and fills each mold tube is determined by the internal diameter of the mold tube 33, the outside diameter of the injector tube 100 and by the spacing between the opposed ends of the front and rear mold rods 61, 64. Vents 34 provide for escape of air from within each mold tube 33, all around the periphery of each mold tube. The air is forced out of vents 34, then through the breather sleeves 39*a* and the large breather openings 39 to collector groove 40 and return line 42.

While the mold tubes are being filled, the rod assembly 50 remains in the fill position. When filling is completed, however, the reciprocating mold drive connected to drive rod 59 and yoke 58 drives mold rod assembly 50 from its fill position, to the discharge position. During this movement, both sets of mold rods 61 and 64 move conjointly, since drawbar 52 is connected directly to yoke 58, and drawbar 51 is effectively connected to the yoke 58 through the guide rods 55 and drawbar 52. That is, spacing remains constant throughout the cyclic movement of the mold rod assembly from its fill position to its discharge position and back again.

When mold rod assembly 50 reaches its discharge position, there is a rod-shaped molded food product 130 suspended between the facing ends of each pair of mold rods 61, 64 of the apparatus. The molded food products 130 are dislodged from the mold rods and deposited upon a take away conveyor 134 by a knockout mechanism 140 such as described in U.S. Pat. Nos. 4,928,591; 6,428,303; 4,996,743; 4,768,325; 4,182,003; 4,054,967; 3,887,964, or Re. 30,096, all herein incorporated by reference.

At this point in the machine cycle, the drive connected to rod 59 reverses and pulls yoke 58 to its fill position. In this manner mold tube assembly 50 of the apparatus is returned to the fill position shown in FIGS. 1A and 1B and a new fill cycle begins.

Describing the two-component filling operation in more detail, in the position shown in FIGS. 1A and 1B, the rod assembly 50 is fully retracted, to the rear, the filling valve 107 (FIG. 1B) is closed, and the cylinder rods 80, 82 of the air cylinders 76, 78 are energized in the extend direction, urging the cylinder rods 80, 82 to the left in the Figures, to force the rear portions 126 against the bumpers 122. The first component 29 is pressurized and fills within the mold tubes 33 around the injector tubes 100. The forward open end 102 of the injector tubes 100 are closed within sockets 142 in the front mold rods 61.

The rod assembly 50 then begins to move to the right in the Figure. The open end 102 of each of the injector tubes 100 moves out of the socket 142 and becomes exposed within the tube 33 and is relatively moved to the left a short distance from an end face 143 of the front rod 61. The first component 29 fills the space between the open end 102 and the end face 143 (see FIGS. 2A, 2B and 8) forming a shell 145 (see FIG. 8). The valve 107 remains closed and substantially no inner fill component 109 exits the open ends 102.

An illustrated in FIGS. 2A and 2B the rod assembly 50 has moved further forward and the front mold rods 61 maintain a seal off condition with the tubes 33 when the opening 38 passes over the entrance 37, i.e., a solid portion of the tube 33 blocks the entrance 37. The filling valve 107 (FIG. 1B) is opened at this point and filling can begin into the center voids of the shells 145 formed by the outer component 29, the center voids created by the retracting injector tubes 100. The air cylinders 76, 78 remain energized in the extend direction, urging the cylinder rods 80, 82 to the left in the Figure, with hold the injector manifold 70 against the bumpers 122.

Figure 3B:
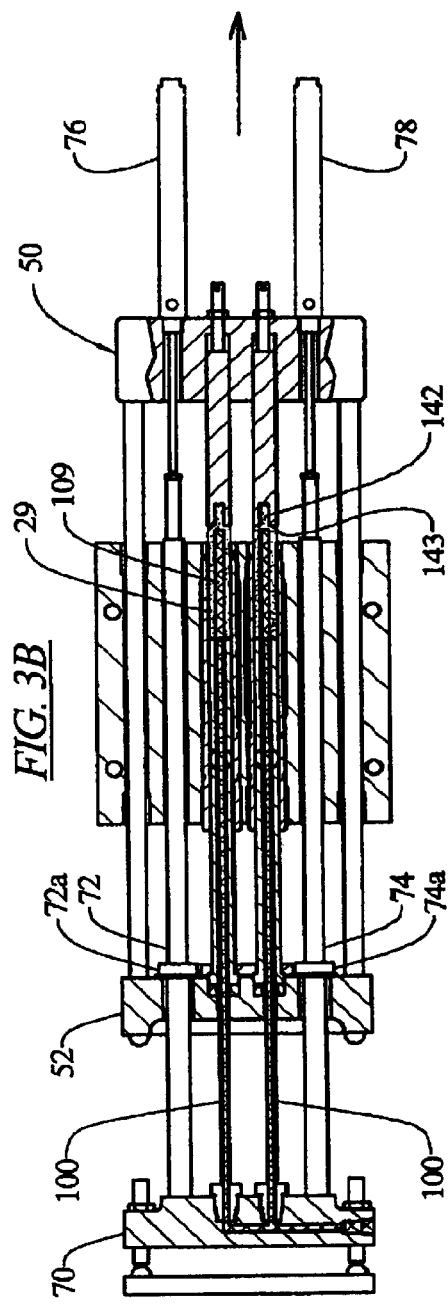
FIG. 3B is a diagrammatic, horizontal sectional view of the forming machine of FIG. 3A.
Figure 3A:
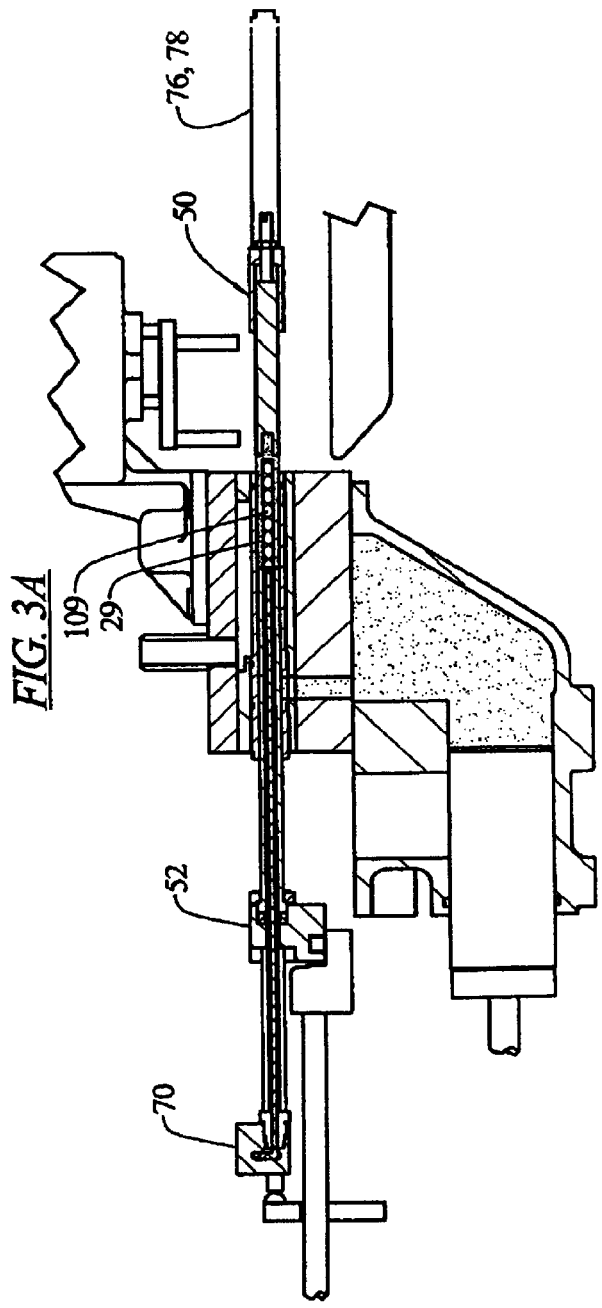
FIG. 3A is a diagrammatic, vertical sectional view of the forming machine of FIGS. 2A and 2B, the forming machine shown moving further toward the discharge position.

FIGS. 3A and 3B illustrate that the rod assembly 50 moves forward until the rear drawbar 52 contacts the heads 72*a*, 74*a* on the actuator rods 72, 74. The filling valve 107 (FIG. 1B) is closed at this point. The air cylinders 76, 78 remain energized in the extend direction, urging the cylinder rods 80, 82 to the left in the Figure. The center void of the outer, first food product 29 is filled with inner, second component 109 at this point. The injector manifold 70 begins to move forward with the rod assembly 50 after this point.

FIGS. 4A and 4B illustrate the rod assembly 50 is fully extended forward to the discharge or knockout position. The filling valve 107 (FIG. 1B) remains closed. The air cylinder 76, 78 remain energized in the extend direction, urging the cylinder rods 80, 82 to the left in the Figures. A molded food product 130, for each tube 33, that includes the outer, first component 29 surrounding the inner, second component 109, is exposed out of the tube 33 in the discharge position.

FIGS. 5A and 5B illustrate that the rod assembly 50 is fully extended. The filling valve 107 (FIG. 1B) remains closed. The air cylinders 76, 78 remain energized in the extend direction, urging the cylinder rods 80, 82 to the left in the Figures. The knockout assembly 140 is lowered and the product 130 is deposited on the conveyor 134.

FIGS. 6A and 6B illustrate that the knockout mechanism 140 is raised. The rod assembly 50 can begin the return stroke, to the left in the Figures. The filling valve 107 (FIG. 1B) remains closed. The air cylinders 76, 78 are energized in the retract direction, urging the cylinder rods 80, 82 toward the right in the Figure, as the rod assembly 50 begins the return stroke.

FIGS. 7A and 7B illustrate rod assembly 50 beginning the return stroke. The filling valve 107 (FIG. 1B) remains closed. The air cylinders 76, 78 are energized in the retract direction, urging the cylinder rods 80, 82 toward the right in the Figures, and hold the injector assembly stationery until the front bumpers 110 contact the adjusters 112. Both rod assembly 50 and the injector manifold 70 and rods 72, 74 continue moving together toward the fully retracted position, returning to the position shown in FIGS. 1A and 1B.

The preferred embodiment apparatus of the invention provides adjustability of the product length "L" and the filling length "F" of the second component, as shown in FIG. 8. By adjusting the studs 66, the length L of the product can be changed. By adjusting the home position of the manifold 70 along the length of the studs 112, an initial projection of the tubes 100 into the sockets 142 of the front rods 61 can be set and the resulting length F of the second component can be adjusted.

As an alternative pumping arrangement for the second component (not shown), a plurality of filling cylinders could be provided, each filling cylinder having a pre-selected dispensing volume equivalent to the desired volume of second component to be injected into each shell 145. Each filling cylinder could have an inlet arranged in fluid communication with the supply of second component 109. Each filling cylinder could have an outlet arranged in fluid communication with one injector tube 100. A filling piston slidable within each filling cylinder would be moved through the cylinder to inject the pre-selected dispensing volume of second component into each shell, similar to the action of a syringe. The filling pistons for all the filling cylinders could be reciprocally driven, through an injection and return stroke, by a linkage to the reciprocating mold rod assembly. Another pump could replenish second component into the filling cylinders, during the return stroke and/or after the filling pistons return to a home position.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method for forming a molded food product having a first component surrounding an inner, second component, comprising the steps of:

arranging a mold cavity defined by an outer wall and an inner tube, said inner tube having an open end, and two end wall portions spaced apart and positionable within the outer wall;

filling the mold cavity with a first component forming a shell having an inside void;

relatively retracting the inner tube along a first axis with respect to the mold cavity and filling the inside volume occupied by the inner tube with the second component through the inner tube and out of the inner tube open end to complete the molded food product, wherein at least one of said first and second components is a food product; and moving the end wall portions along the first axis to a position wherein the molded food product is outside the outer wall to remove the molded food product.

2. The method according to claim 1, wherein the inner tube open end is relatively movable with respect to the end wall portions only to positions at or between the end wall portions.

3. The method according to claim 2, wherein the outer wall is stationary and the end wall portions are formed on rods which are configured to slide within said outer wall.

4. The method according to claim 1, wherein said inner tube is movable with respect to the outer wall.

* * * * *